(12) United States Patent
Cheng et al.

(10) Patent No.: US 11,536,429 B1
(45) Date of Patent: Dec. 27, 2022

(54) WIRELESS LIGHTING DEVICE WITH ENCAPSULATED LIGHT BOARD

(71) Applicant: Zealio Electronics Co., Ltd., HsinChu (TW)

(72) Inventors: Chia-Pao Cheng, HsinChu (TW); Pao-Lin Guo, HsinChu (TW); An-Tsun Teng, HsinChu (TW)

(73) Assignee: ZEALIO ELECTRONICS CO., LTD., Hsinchu (TW)

( * ) Notice: Subject to any disclaimer, the term of this patent is extended or adjusted under 35 U.S.C. 154(b) by 0 days.

(21) Appl. No.: 17/724,779

(22) Filed: Apr. 20, 2022

(51) Int. Cl.
| | | |
|---|---|---|
| *F21S 9/02* | (2006.01) |
| *F21V 23/04* | (2006.01) |
| *F21V 3/04* | (2018.01) |
| *B60Q 3/217* | (2017.01) |
| *G01V 3/08* | (2006.01) |
| *G01V 7/02* | (2006.01) |
| *G01V 3/12* | (2006.01) |
| *B60Q 3/233* | (2017.01) |
| *G09F 13/04* | (2006.01) |

(52) U.S. Cl.
CPC ............... *F21S 9/02* (2013.01); *B60Q 3/217* (2017.02); *B60Q 3/233* (2017.02); *F21V 3/049* (2013.01); *F21V 23/0435* (2013.01); *F21V 23/0442* (2013.01); *G01V 3/08* (2013.01); *G01V 3/12* (2013.01); *G01V 7/02* (2013.01); *B60Q 2900/30* (2013.01); *G09F 13/044* (2021.05)

(58) Field of Classification Search
CPC .... G09F 13/044; B60Q 3/233; B60Q 2900/30
See application file for complete search history.

(56) References Cited

U.S. PATENT DOCUMENTS

| | | | | |
|---|---|---|---|---|
| 9,840,189 | B1* | 12/2017 | Anderson | G09F 21/048 |
| 10,627,061 | B2* | 4/2020 | Hsiao | F21S 9/02 |
| 11,097,657 | B1* | 8/2021 | Hsiao | B60Q 1/2615 |
| 2003/0169178 | A1* | 9/2003 | Jensen | F21V 21/0824 340/815.5 |
| 2005/0028415 | A1* | 2/2005 | Rodriguez | G09F 21/04 40/593 |

(Continued)

FOREIGN PATENT DOCUMENTS

| | | | | |
|---|---|---|---|---|
| FR | 3047697 | A1 * | 8/2017 | |
| WO | WO-2020093139 | A1 * | 5/2020 | B60Q 1/0005 |

*Primary Examiner* — Colin J Cattanach
(74) *Attorney, Agent, or Firm* — Blue Filament Law PLLC

(57) ABSTRACT

A wireless lighting device for vehicle accessories includes a signal transmitter and an encapsulated light board. The light board includes a unitary baseplate, a backlight module, a power module, and a top cover. The backlight module including a circuit board, light emitting elements, a transceiver, and a control module configured to turn the light emitting elements on and off according to the detected signal. The power module including a battery and a conductive strip configured to electrically connect the battery to the circuit board. The top cover configured to be irreversibly sealed to the baseplate with a customizable light permeable region covering the light elements. The transmitter configured to be installed on a door or a frame of a vehicle, and the light board configured to be installed in a vehicle accessory. The wireless lighting device having at least a ten year operational life without replacement of the batteries therein.

25 Claims, 13 Drawing Sheets

(56) References Cited

U.S. PATENT DOCUMENTS

| | | | | |
|---|---|---|---|---|
| 2005/0036327 A1* | 2/2005 | Patel | ......................... | B60Q 3/80 |
| | | | | 362/487 |
| 2006/0176710 A1* | 8/2006 | Meinke | ................... | B60R 13/04 |
| | | | | 362/503 |
| 2012/0224359 A1* | 9/2012 | Chun | ...................... | F21V 3/049 |
| | | | | 362/183 |
| 2013/0128600 A1* | 5/2013 | Bjorn | .................. | F21V 33/0064 |
| | | | | 362/108 |
| 2013/0336004 A1* | 12/2013 | Mulder | .................. | B60Q 3/217 |
| | | | | 362/609 |
| 2014/0192512 A1* | 7/2014 | Bushee | ..................... | F21K 9/00 |
| | | | | 362/84 |
| 2014/0375434 A1* | 12/2014 | Puljan | .................... | G09F 13/04 |
| | | | | 340/12.5 |
| 2015/0233560 A1* | 8/2015 | Cheng | .................... | B60Q 3/217 |
| | | | | 362/190 |
| 2015/0260935 A1* | 9/2015 | Williams | ............. | H02G 3/0437 |
| | | | | 362/217.14 |
| 2017/0200403 A1* | 7/2017 | Salter | .................... | B60R 13/005 |
| 2017/0297497 A1* | 10/2017 | De Wind | .................. | B60R 1/04 |
| 2017/0349119 A1* | 12/2017 | Eiland | ................... | G09F 21/049 |
| 2018/0251032 A1* | 9/2018 | Kang | .................... | B60K 37/02 |
| 2018/0322712 A1* | 11/2018 | Salter | .................... | G09F 13/005 |
| 2019/0191533 A1* | 6/2019 | Cheng | .................... | G06F 3/044 |
| 2020/0142123 A1* | 5/2020 | Cheng | ................. | H03K 17/962 |
| 2021/0086675 A1* | 3/2021 | Tait | ......................... | B60R 11/02 |
| 2021/0089852 A1* | 3/2021 | Chen | ................ | G06K 19/07707 |

\* cited by examiner

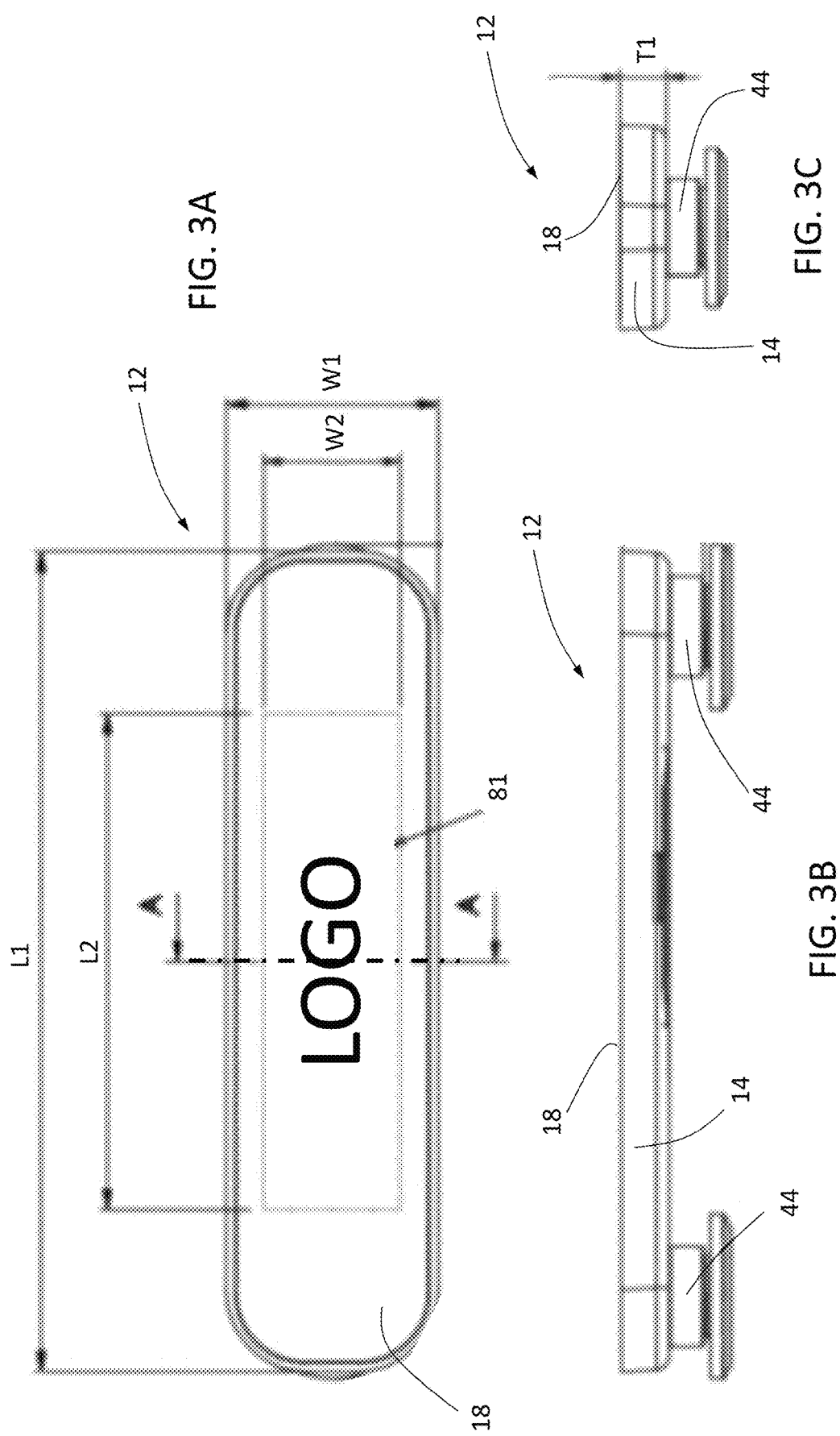

WIRELESS LIGHTING DEVICE WITH ENCAPSULATED LIGHT BOARD

FIELD OF THE INVENTION

The present invention relates in general to a wireless light board, and in particular to a wireless light board accessory for a vehicle.

BACKGROUND OF THE INVENTION

In modern society, cars are widely used as tools for people to travel and to transport goods. Many vehicles have lighting devices that are used as decorative effects and also to provide daytime and nighttime warning and safety effects. Many of such lighting devices are provided on the vehicle as originally manufactured, installed by manufacturers as standard features of a vehicle or as special add on features specially selected and paid for by consumers. Additionally, some lighting effects may be installed by consumers as "aftermarket" add-ons.

For example, lighting devices may be provided on vehicle doors, floor mats, seats, and other portions of vehicle exteriors or interiors. Lighting devices provided on vehicle doors may serve as warning and safety lights, so that when the door opens the lighting device illuminates to provide a visual warning to rear approaching cars and pedestrians, altering them to the open door so that collisions can be avoided. Vehicle door lighting devices may also serve as "welcome" lights, so that when the door opens, the lighting device is illuminated to enhance visibility as a driver or passenger enters or exits the vehicle. Additionally, lighting devices provided on a vehicle exterior, such as in the vehicle doors, hood, trunk, etc. and/or on a vehicle or interior, such as in floor mats, seats, dashboard, steering wheel, footwells, etc. may also be provided to illuminate upon locking or unlocking of the vehicle or upon opening of the vehicle door to enhance visibility or to show some decorative effect such as a brand name or logo.

While such lighting devices are currently available on the market, existing devices encounter several problems. First, many of such lighting devices are hardwired into a vehicle, which is problematic because they require electrical harnesses to connect the lighting devices to the vehicle power supply. Such harnesses are expensive and complex. Furthermore, such hard wired devices are difficult and expensive to wire into the vehicle, making aftermarket installation difficult and expensive, particularly for typical consumers. Furthermore, such hard wired lighting devices can easily short circuit, thereby failing to function as intended while also potentially impeding the functionality of other components that are provided on the same circuit. Additionally, such hard wired lighting devices place additional electrical load on the vehicle's power supply, potentially draining the vehicle's battery if the lighting device malfunctions in some way.

Other existing lighting devices are provided with batteries as an on-unit power source. While avoiding some of the problems associated with hard wired lighting devices, existing battery powered lighting devices encounter their own problems. For example, the batteries on such lighting devices have short lifespans, dying after short periods of time, such as a year or two at most. Such existing battery-operated lighting devices are thus configured so that the battery compartments thereof may be easily accessed by a typical vehicle owner so that the expired batteries can be removed and replaced with new, operational batteries to ensure that the lighting device resumes functioning. However, replacement of such batteries can be costly over time and relies on a vehicle owner to replace the batteries correctly or at all. Replacement of the batteries can be inconvenient for the vehicle owner, and in the event that a vehicle owner fails to replace the batteries correctly or at all, the lighting devices are left non-functional, thereby unable to provide the safety features, enhanced visibility, aesthetics, and brand awareness they were intended to provide. Furthermore, given that the battery compartments of such battery-operated lighting devices must be easily accessible so the batteries may be changed, the battery compartment is vulnerable to environmental exposures such as humidity, moisture from precipitation, and extreme temperatures which can damage or ruin the lighting device, again destroying the intended functionality thereof. Lighting devices positioned in floor mats, which routinely contact wet shoes; vehicle doors, which routinely open into rain or snow; and vehicle exteriors, which are entirely open to the outdoor environment, are particularly susceptible to such environmental damage to the batteries and accessible battery compartments.

Thus, there exists a need for a lighting device for vehicles that provides safety features, enhanced visibility, aesthetics, and brand awareness that overcomes the problems associated with existing hard wired lighting devices and battery-operated lighting devices, instead providing a long-lasting operational life and easy installation by manufacturers or aftermarket, while also avoiding potential damage and failure caused by short circuits, user errors, or environmental factors.

SUMMARY OF THE INVENTION

The present invention provides a wireless lighting device for vehicle accessories that includes a transmitter configured to transmit a signal and an encapsulated light board. The encapsulated light board includes a baseplate, a backlight module, a power module, and a top cover. The baseplate being integrally formed as a unitary body and defining at least one recess therein. The backlight module comprising a circuit board, a plurality of light emitting elements, a transceiver configured to detect the signal transmitted by the transmitter, and a control module configured to turn the light emitting elements on and off according to the signal detected by the transmitter. The backlight module configured to be accommodated within the recess of the baseplate. The power module including at least one battery and a conductive strip, the conductive strip extending from an end of the circuit board and configured to electrically connect the at least one battery to the circuit board and provides power to the transmitter and the backlight module for 10 years of vehicle usage without opening the encapsulated light board. The top cover having at least one light permeable region, the top cover configured to cover the backlight module and the power module and to be irreversibly sealed to the baseplate to complete the encapsulant. The transmitter configured to be installed on a door or a frame of a vehicle, and the encapsulated light board configured to be installed in a vehicle seat, a vehicle floor mat, or a vehicle door. Advantageously, the wireless lighting device has at least a ten year operational life without replacement of the batteries therein.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3A is a top view of a light board of a wireless lighting device according to embodiments of the present invention;

FIG. 3B is a side view of the light board of FIG. 3A;

FIG. 3C is an end view of the light board of FIGS. 3A and 3B;

DESCRIPTION OF THE INVENTION

Figure 1:
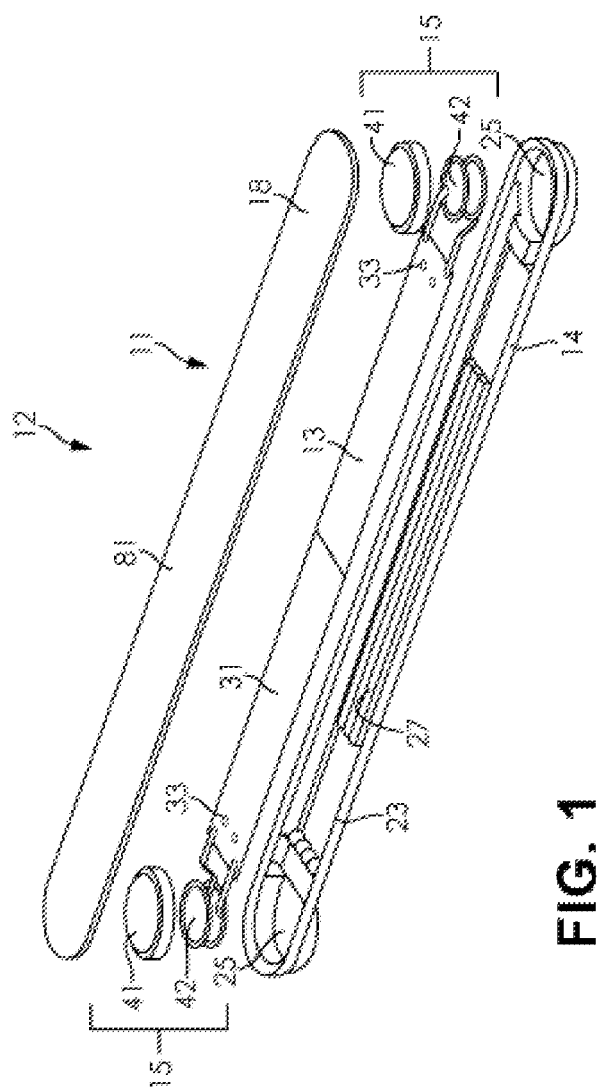
FIG. 1 is an exploded perspective view of a wireless light board of a wireless lighting device according to embodiments of the present invention.

The present invention has utility as a wireless lighting device for vehicles that provides safety features, enhanced visibility, aesthetics, and brand awareness that provides a long-lasting operational life and easy installation by manufacturers or aftermarket, while also avoiding potential damage and failure caused by short circuits, user errors, or environmental factors.

The present invention will now be described with reference to the following embodiments. As is apparent by these descriptions, this invention can be embodied in different forms and should not be construed as limited to the embodiments set forth herein. Rather, these embodiments are provided so that this disclosure will be thorough and complete, and will fully convey the scope of the invention to those skilled in the art. For example, features illustrated with respect to one embodiment can be incorporated into other embodiments, and features illustrated with respect to a particular embodiment may be deleted from the embodiment. In addition, numerous variations and additions to the embodiments suggested herein will be apparent to those skilled in the art in light of the instant disclosure, which do not depart from the instant invention. Hence, the following specification is intended to illustrate some particular embodiments of the invention, and not to exhaustively specify all permutations, combinations, and variations thereof.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Unless indicated otherwise, explicitly or by context, the following terms are used herein as set forth below.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

According to embodiments, the present invention provides a wireless lighting device 10 for vehicle accessories whose novel design provides compactness, easy installation, long operational life without battery changes, high power efficiency, and encapsulation to protect the device from environmental effects and from human interference. The inventive wireless lighting device 10 is configured to use in vehicle exteriors and/or vehicle interiors including hoods, trunks, doors, seats, dashboards, seats, steering wheels, floormats, and other suitable components.

Figure 2:
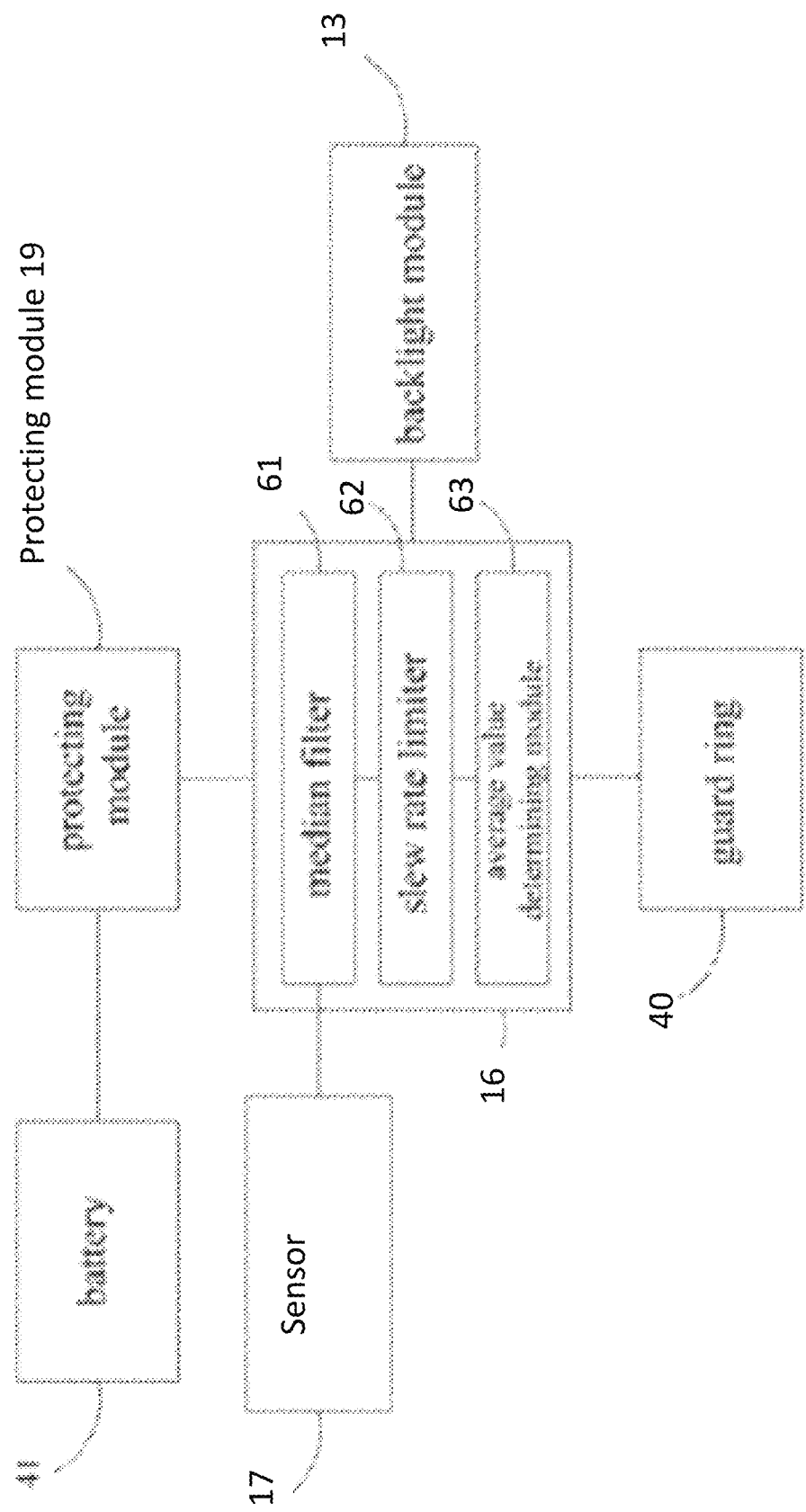
FIG. 2 is a schematic showing the elements of a circuit board of a wireless light board according to embodiments of the present invention.
Figure 4B:
FIG. 4B is a detailed cross sectional view of the portion B indicated in FIG. 4A.
Figure 4A:
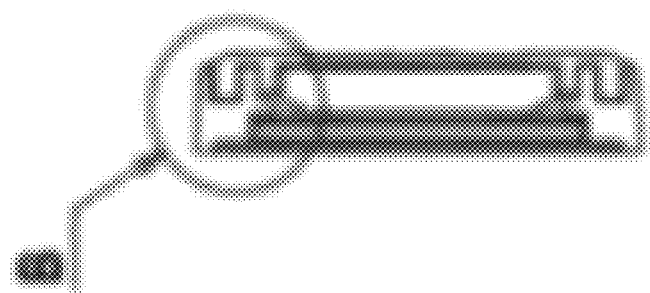
FIG. 4A is a cross sectional view of the light board of FIG. 3A taken along line A-A.
Figure 5B:
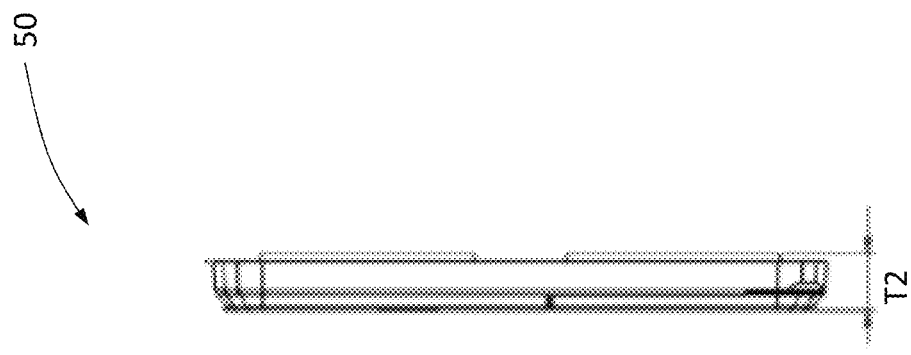
FIG. 5B is a side view of the transmitter unit of FIG. 5A.
Figure 5A:
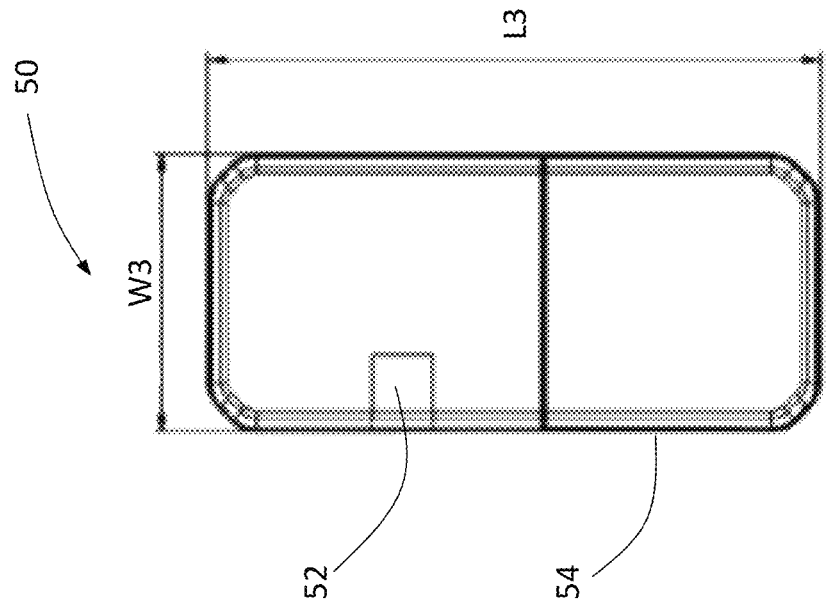
FIG. 5A is a front view of a transmitter unit of a wireless lighting device according to embodiments of the present invention.
Figure 11:
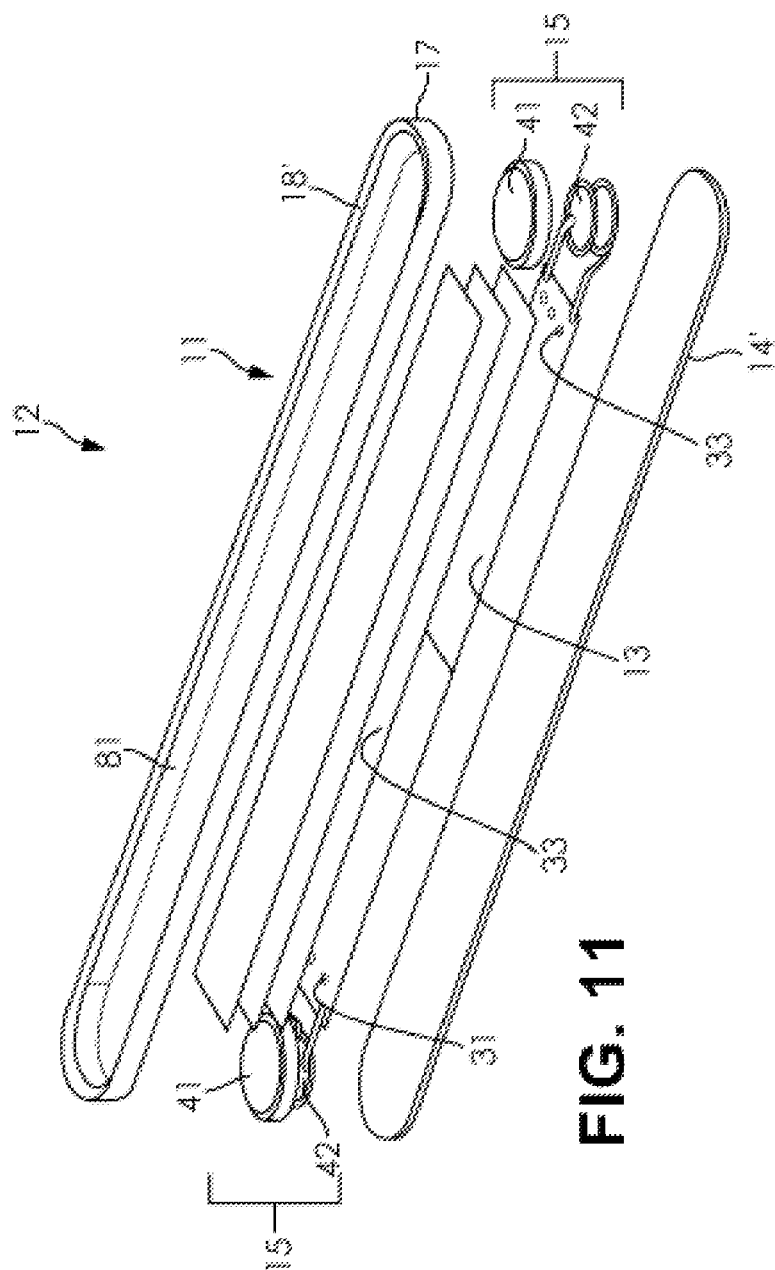
FIG. 11 is an exploded perspective view of a wireless light board of a wireless lighting device according to embodiments of the present invention.
Figure 12:
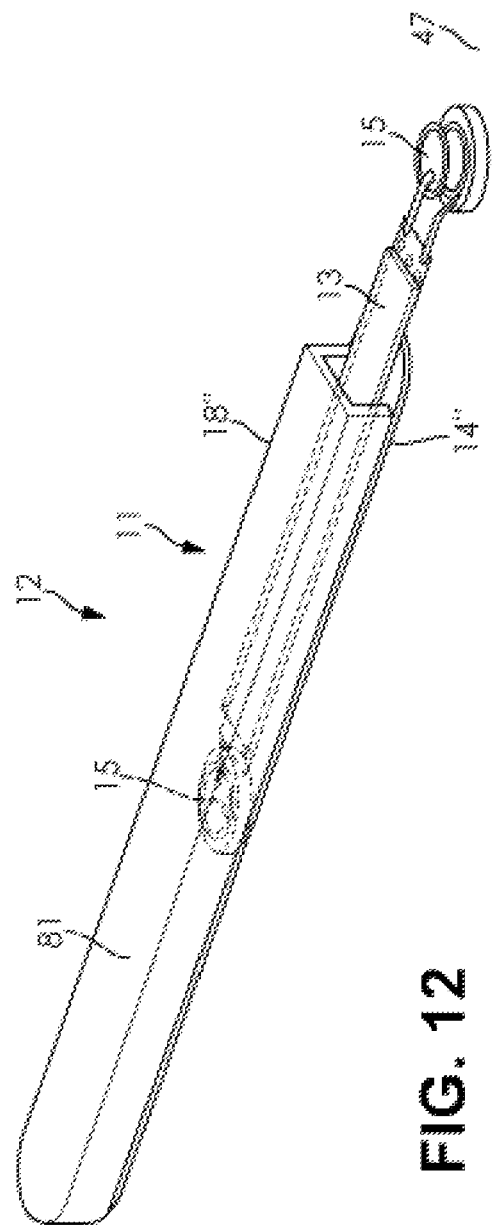
FIG. 12 is an exploded perspective view of a wireless light board of a wireless lighting device according to embodiments of the present invention.

Referring to FIGS. 1, 11, and 12, a wireless lighting device 10 according to inventive embodiments of the present invention includes an encapsulated light board 12. FIGS. 1, 11, and 12 show exploded perspective views of a light board 12 of a wireless lighting device 10 according to embodiments of the present invention. The wireless light board 12 includes a housing 11 that includes a baseplate 14, 14', 14", a backlight module 13, a power module 15, a sensor 17, a control module 16 (shown in FIG. 2), a sealed top cover 18, 18', 18", and an optional protecting module 19. The top cover 18, 18', 18" is configured to be irreversibly sealed to the baseplate 14. 14', 14" to define an encapsulant and an internal volume therein. The backlight module 13, power module 15, sensor 17, control module, 16, and optional protecting module 19 are configured to be positioned within the internal volume of the housing 11 and sealed therein. FIG. 2 is a block diagram schematically showing the system of a wireless lighting device 10 according to embodiments of the present invention. The detailed structure thereof is described below.

As shown in FIG. 1, the baseplate 14, according to inventive embodiments, has an upper surface and a lower surface opposite to the upper surface, wherein the upper surface has a main recess 23 and at least one battery recess 25 formed in at least one end of the main recess 23. According to some inventive embodiments, the main recess 23 is provided between two battery recesses 25. According to still other inventive embodiments, the main recess 23 has a plurality of ridges 27 formed therein, which provide a platform for the backlight module 13 and allow for air gaps between the various components of the light board 12. As shown in FIG. 11, the baseplate 14', according to inventive embodiments, is a planar component configured to be sealed with a top cover 18' that includes walls 17. As shown in FIG. 12, housing 11, according to inventive embodiments, includes a baseplate 14" and a top cover 18" that are joined or formed together as a tube into which the backlight module 13 may be slid. According to inventive embodiments, a cap 47 is additionally provided as part of the housing 11. The cap 47 is configured to be irreversibly sealed to the baseplate 14" and the top cover 18".

According to inventive embodiments, the baseplate 14, 14', 14" is formed of a plastic or metal material. According to still other inventive embodiments, the baseplate 14, 14', 14" is integrally formed as a single unitary body.

The backlight module 13 is accommodated by the baseplate 14 and includes a circuit board 31. According to some inventive embodiments, the circuit board 31 is accommodated within the main recess 23 or the baseplate 14. According to other inventive embodiments, the backlight module 13 includes a plurality of light-emitting elements 33. The light-emitting elements 33 may be but are not limited to be edge-lit LEDs. According to still other inventive embodiments, the light-emitting elements 33 are positioned at the two ends of the circuit board 31, however, they may be provided in any position or pattern on the circuit board 31. According to still other inventive embodiments, the backlight module 13 additionally includes a light-guide plate (not shown) arranged above the circuit board 31 to distribute the light of the light-emitting elements 33 uniformly. It can be understood that a plurality of dot patterns is utilized to form inside the light-guide plate to effectively diffuse light. According to still other inventive embodiments, the circuit board 31 includes an anti-electromagnetic interference structure which is formed by net copper layout.

According to some inventive embodiments, the power module 15 includes at least one battery 41 and at least one conductive strip 42, wherein at least one battery 41 is positioned inside the battery recess 25 and the conductive strip 42 electrically connects to the battery 41 and the circuit board 31. According to other inventive embodiments, the conductive strip 42 is also positioned in the battery recesses 25. As shown in FIG. 1, a conductive strip 42 is provided at each of the ends of the circuit board 31 and the conductive strips 42 are configured to be accommodated within the battery recesses 25 at the ends of the baseplate 14. As shown in the still other inventive embodiment of FIG. 1, there are two batteries 41, each being configured to be positioned in a battery recess 25 at the ends of the baseplate 14 with a conductive strip 42 of the backlight module 13 to electrically connect each battery 41 to the circuit board. According to still other inventive embodiments, the batteries 41 of the light board 12 are each CR2450 batteries, each having a capacity of 620 mAH. According to still other inventive embodiments, the power consumption of the light board 12 is 8-10 mA when the light board 12 is on and is 1-20 uA when the light board 12 is on standby. According to still other inventive embodiments, the batteries 41 of the light board 12 are designed to provide up to ten years of operational life.

According to some inventive embodiments, the circuit board 31 has a sensor 17 electrically coupled thereto. According to some inventive embodiments, the sensor 17 is a magnetic sensor as described in U.S. Pat. No. 10,883,856, which was issued on Jan. 5, 2021. According to such embodiments, the light board is provided in a vehicle door or a vehicle door frame or sill and the interaction of the sensor 17 and the vehicle door or vehicle frame, results in the on/off operation of the wireless light board 12 of the inventive wireless lighting device 10. When the wireless lighting device 10 of the present invention is applied to a vehicle, such as with the light board 12 provided on a vehicle exterior, door, or door sill component and the opening or closing of the door 76 causes differences in the magnetic strength received by the sensor 17 due to the proximity or separation of the door 76. For example, when the door 76 is opened away from the vehicle V frame 75 or closed, the sensor 17 detects different magnetic values for the control module 16 to turn on or off the backlight module 13 accordingly.

Figure 13:
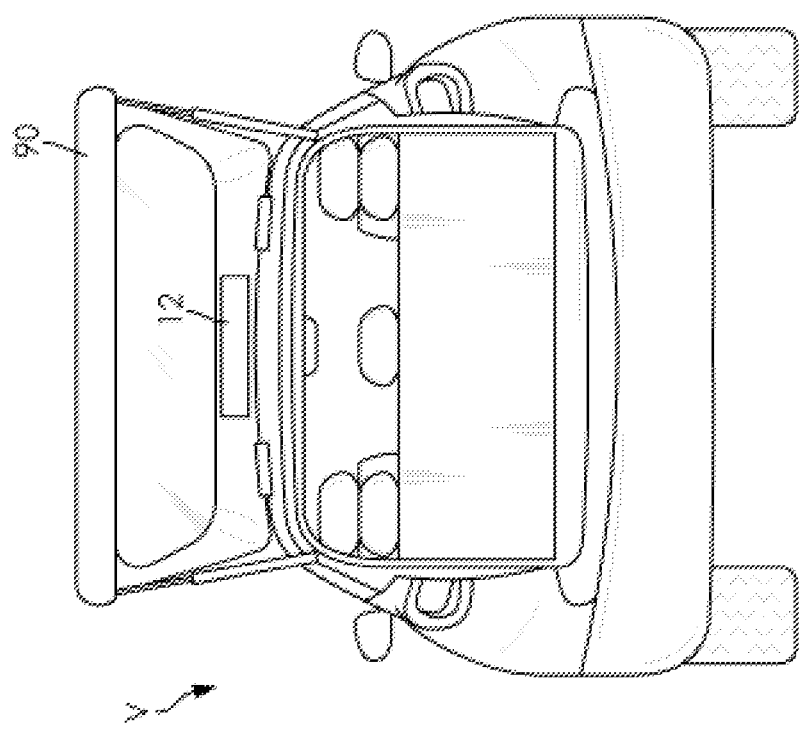
FIG. 13 is a rear view of a vehicle having a wireless lighting device mounted on a liftgate thereof according to embodiments of the present invention.

According to some inventive embodiments, the sensor 17 is a gravity sensor. According to embodiments, the gravity sensor measures the direction and intensity of gravity. Using such data, the relative direction of the device within a space is determined. FIG. 13 shows a rear view of a vehicle V having a liftgate 90 shown in an open position. On an interior side of the liftgate 90, a wireless light board 12 is provided. According to embodiments, the gravity sensor within the light board 12 senses the gravitational change when the liftgate is moved from a closed position to an open position, as shown, whereby the control module 16 turns the light-emitting elements 33 of the wireless light board 12 on, such that a logo provided thereon is illuminated. Upon closing the liftgate, the sensor 17 again senses this gravitational change, thereby causing the light-emitting elements 33 of the wireless light board 12 to be turned off so that the light board 12 is not illuminated when the liftgate 90 is in a closed position. According to further embodiments, the light-emitting elements 33 are configured to turn on when the liftgate 90 is closed and off when the liftgate 90 is open. According to further embodiments, the wireless light board 12 is provided on an exterior side of the liftgate 90.

According to some inventive embodiments, the sensor 17 is a radio frequency transceiver, such as a 2.4 G radio frequency transceiver chip. According to other inventive embodiments, the transceiver works in conjunction with a wireless SOC processor. According to embodiments, in which the sensor 17 is a transceiver is configured to detect radio frequency emitted by a separately provided radio frequency transmitter 52 provided in a transmitter unit 50. The transmitter unit 50 is configured to transmit a wireless radio frequency signal to a radio frequency transceiver 17 in the light board. The interaction of the transmitter unit 50 and the transceiver 17 results in the light board 12 turning on and off, controlled by a control module 16. Further details of the components making up the inventive wireless lighting device 10 are described herein. The interaction of the transceiver 17 and the transmitter 52, results in the on/off operation of the wireless light board 12 of the inventive wireless lighting device 10. When the wireless lighting device 10 of the present invention is applied to a vehicle, such as with the light board 12 provided on a vehicle exterior or interior component and the transmitter unit 50 provided for example on the vehicle door 76, the opening or closing of the door 76 causes differences in the radio frequency received by the transceiver 17 due to the proximity or separation of the door 76. For example, when the door 76 is opened away from the vehicle V frame 75 or closed, the transceiver detects different radio frequency values for the control module 16 to turn on or off the backlight module 13 accordingly.

The control module 16 is arranged on the circuit board 31 and electrically connected with the backlight module 13 and the sensor 17. The control module 16 turns on/off the backlight module 13 according to the signal sensed by the sensor 17. In one inventive embodiment, the backlight module 13 is on neither normally-on nor normally-off status. The control module 16 can intelligently adjust the time interval of the turn-on or turn-off state according to the received signal. In this inventive embodiment, the protecting module 19 is connected to the battery 41 and the control module 16. The protecting module 19 protects said control module 16 from short circuit caused by inverse mounting of the battery 41, though according to inventive embodiments, the protecting module 19 may be omitted given that the encapsulated nature of the inventive wireless lighting device 10 prevents a user from changing the batteries 41 thereof, thereby reducing the risk of the batteries 41 being inversely mounted. According to some inventive embodiments, the control module 16 further includes a median filter 61 and a slew rate limiter 62 configured to receive the radio frequency signal from the transceiver 17 and filter noises of the received signal. The control module 16 further includes an average value determining module 63 configured to receive the noise-filtered signal and shift the average value of the signal by comparison of the noise-filtered signal with a previously determined average value of the signal. When the noise-filtered signal is larger than the previously determined average value, the average value is added by a preset value, such as 1. When the noise-filtered signal is smaller than the previously determined average value, the average value is subtracted by a preset value, such as 1. Since the average value may depend on some environmental factors, such as temperature or humidity, the shifting of the average value provides control precision in consideration of the environmental factors. In this inventive embodiment, a guard ring 40 is formed on the circuit board 31 to prevent current leakage.

Referring again to FIGS. 1, 11, and 12, the light board 12 additionally includes a top cover 18, 18', 18" that is configured to cover the backlight module and batteries positioned within the housing 11 and to irreversibly seal to the baseplate 14, 14', 14", thereby encapsulating the backlight module 13 and the batteries 41 therein. Accordingly, it will be understood that the batteries 41 contained therein are not intended to be removable or replaceable. When the top cover 18, 18', 18" is sealed to the baseplate 14, 14', 14", the contents contained therein are protected from the environment and also protected from human interaction. The top cover 18, 18', 18" is arranged on the upper surface of the baseplate 14, 14', 14" and has at least one first light-permeable region 81 arranged above the backlight module 13 and allowing light to emit out. According to some inventive embodiments, the top cover 18, 18', "18" is stuck to the baseplate 14, 14', 14" with a waterproof glue or tape 82 so as to enhance the waterproof effect. In another inventive embodiment, the top cover 18, 18', 18" includes, but not limited to, a digitally-printed inscription plate. According to other inventive embodiments, the inscription plate may be customized to have any letter, character, word, phrase, or pattern with any desired color.

In the present invention, the overall thickness T1 of the wireless light board 12 is controlled to be within 3-10 mm to meet the requirement of slimness and compactness. According to some inventive embodiments, the overall length L1 of the wireless light board 12 is 50-200 mm long, while the overall width W1 of the wireless light board 12 is 20-50 mm wide. According to some inventive embodiments, the light permeable region 81 of the top cover has a length L2 that is anywhere from 10-90% of the length of the wireless light board 12 and a width W2 that is anywhere from 10-90% of the width of the wireless light board 12.

Figure 6:
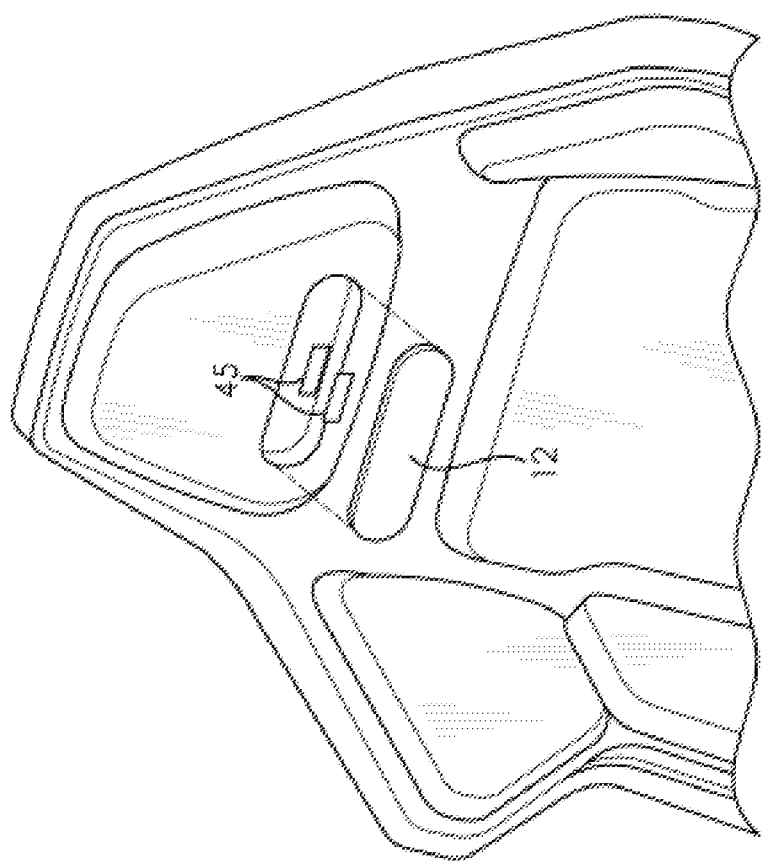
FIG. 6 is a perspective view of an embodiment of a light board of the present invention being installed on a vehicle seat.
Figure 7:
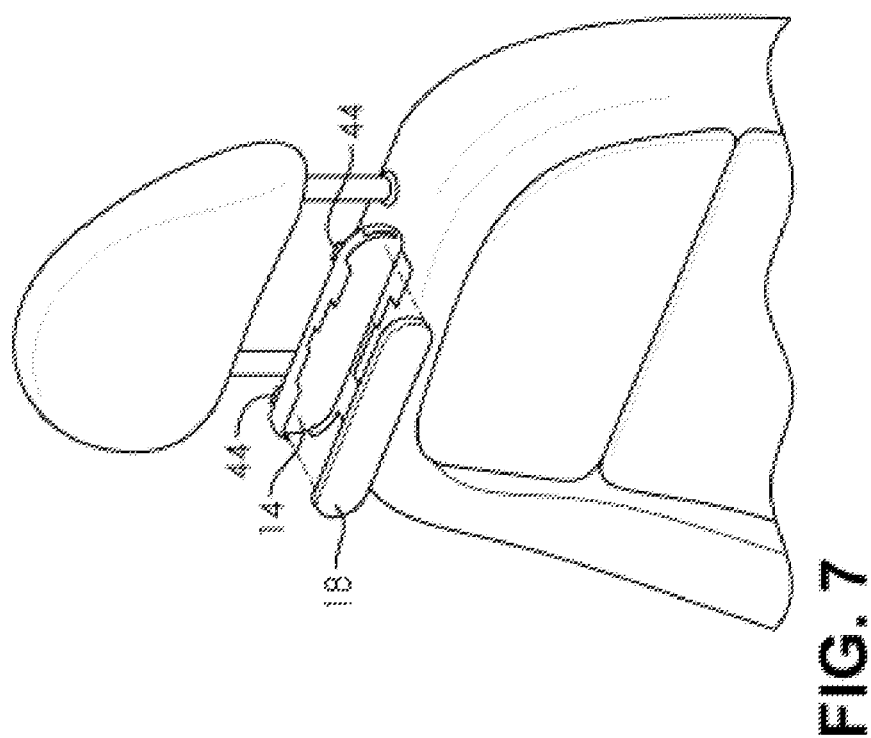
FIG. 7 is a perspective view of an exploded view of an embodiment of a light board of the present invention being installed on a vehicle seat.
Figure 8:
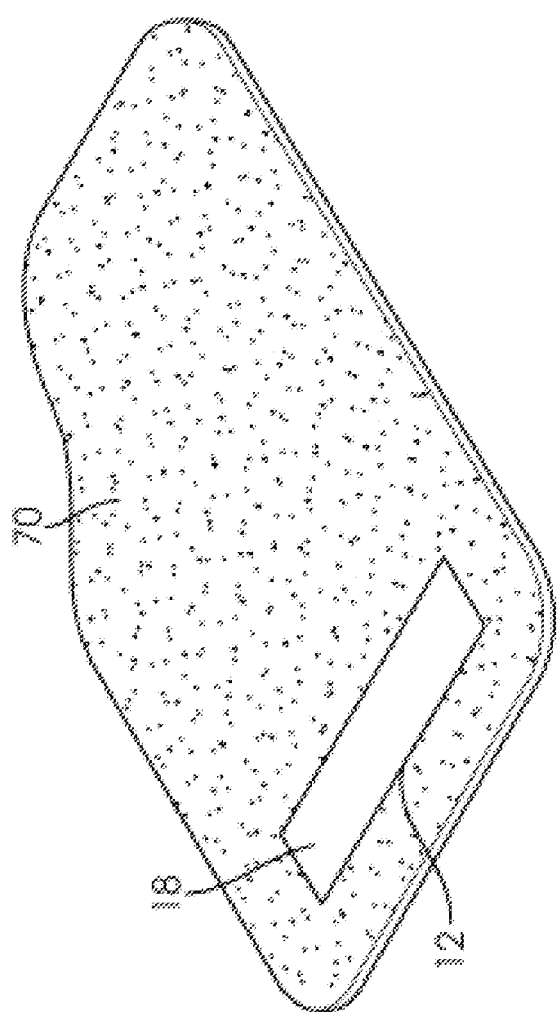
FIG. 8 is a perspective view of a light board embedded within a vehicle floor mat according to embodiments of the present invention.
Figure 9:
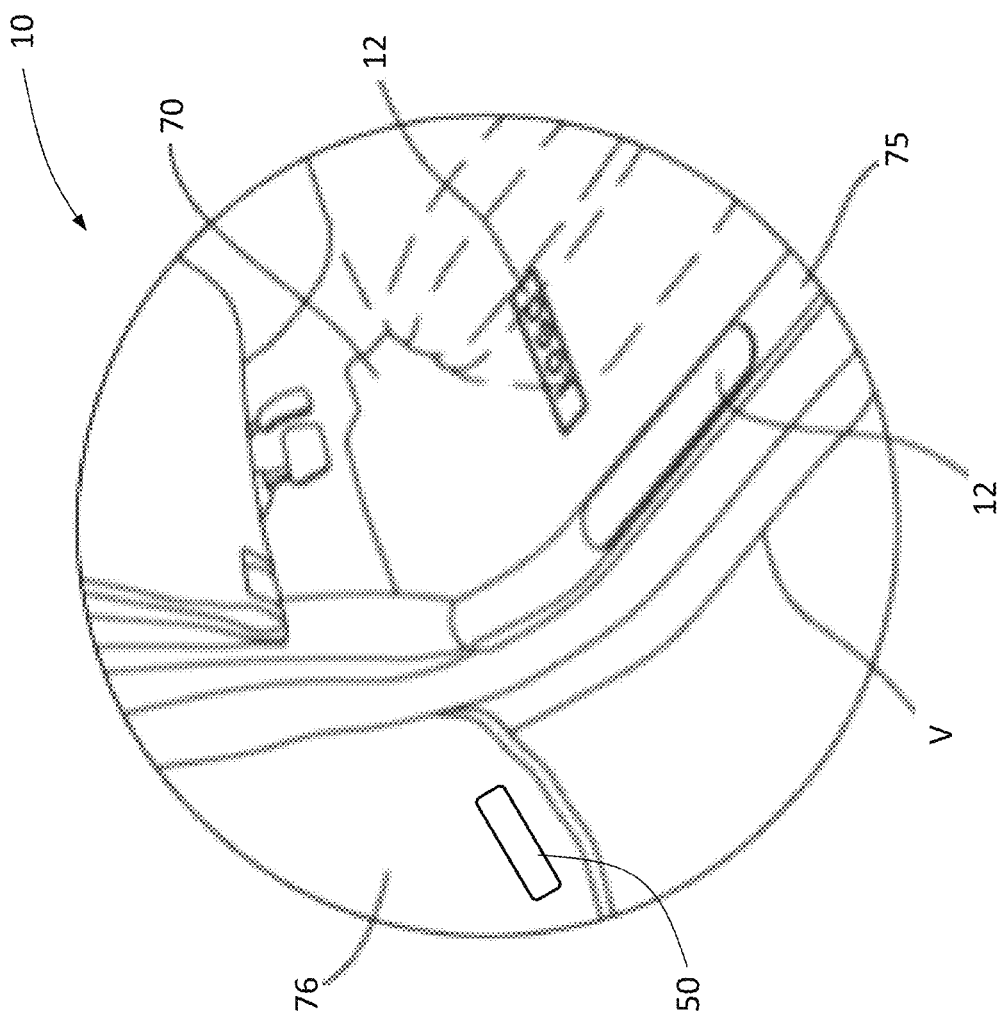
FIG. 9 is a view of a portion of a vehicle having an inventive wireless lighting device installed therein according to embodiments of the present invention.
Figure 10:
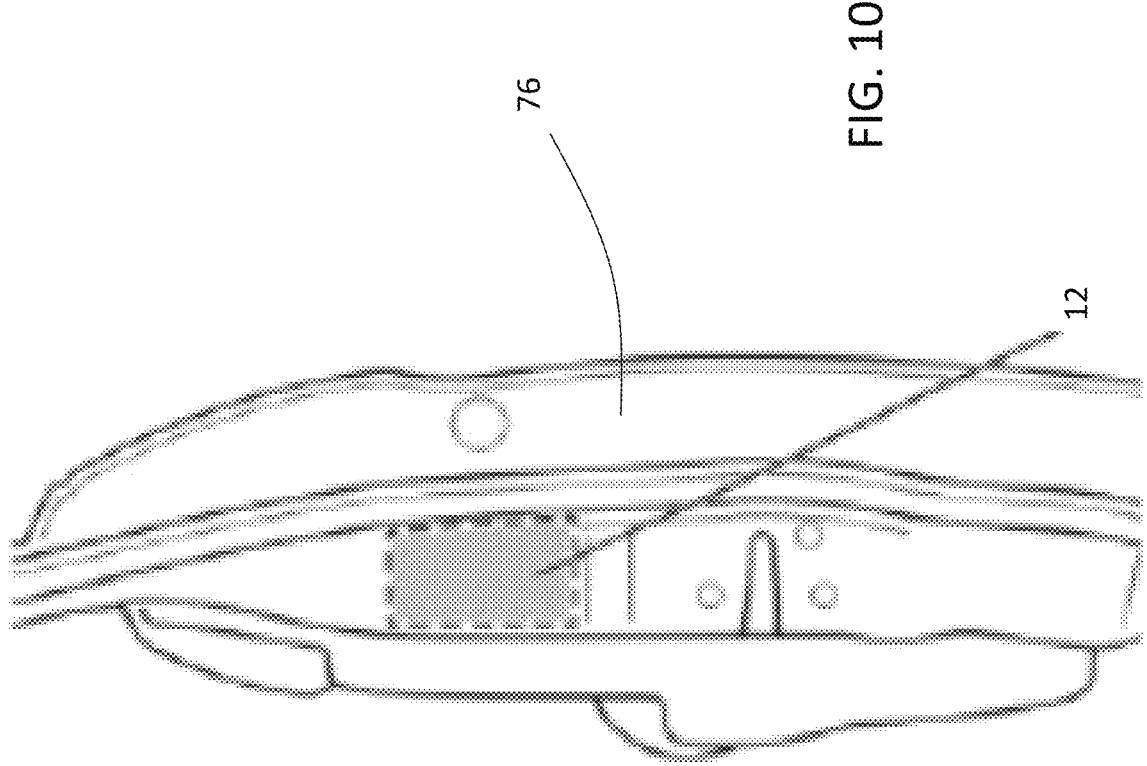
FIG. 10 is an end view of a vehicle door having a light board installed thereon according to embodiments of the present invention.

According to some inventive embodiments, the wireless light board 12 includes at least one attachment bracket 44 that is formed with or attached to the second surface of the baseplate 14, 14', 14". According to still other inventive embodiments, the at least one bracket 44 is adjustable. As shown in FIG. 7, the wireless light board 12 includes two adjustable brackets 44 which are configured to clip to a vehicle component such as a seat headrest as shown. According to still other inventive embodiments, the wireless light board 12 is configured to attach to a vehicle component by way of a double-sided adhesive tape or hook and loop fastener 45, as shown in FIG. 6. According to still other inventive embodiments, the inventive wireless light board 12 is embedded in a vehicle component, given that the batteries 41 are specifically designed to provide a long operation life for the light board 12 and are intended to not ever be removed or replaced. FIG. 8 shows a light board 12 embedded within a floor mat 70 vehicle component.

As noted above, some inventive embodiments of the inventive wireless lighting device 10 additionally include a transmitter unit 50 that includes a transmitter 52 powered by a battery (not shown) all enclosed within a housing 54. According to still other inventive embodiments, the transmitter 52 is a radio frequency transmitter, such as a 2.4 G radio frequency transmitter chip. According to still other inventive embodiments, the battery that powers the transmitter unit 50 is a button battery, such as a TS-SDI: CR2430 or CR2450. Like the wireless light board 12, the transmitter unit 50 is fully encapsulated such that it is not intended to be opened for battery removal or replacement. The encapsulation protects the transmitter unit 50 from environmental effects such as humidity and moisture while also protecting from human interference. The encapsulation of the transmitter unit 50 helps ensure that the operational life of the battery is long. According to some inventive embodiments, the transmitter unit 50 is very compact, being 50-100 mm in length L3, 30-50 mm in width W3, and 3-10 mm thick T2. Like the light board 12, the transmitter unit 50 is wireless and may be installed by a manufacturer or as an aftermarket add on. According to still other inventive embodiments, the transmitter unit 50 is configured to be applied to a vehicle door by double-sided adhesive tape, by s hook and loop fastener, by a clip, or the unit 50 may be embedded in the vehicle door, for example provided in the space between the vehicle exterior panel and the vehicle interior panel. According to still other inventive embodiments, the transmitter unit 50 includes a wireless SOC processor. According to still other inventive embodiments, the transmitter unit has a low power consumption, that is it uses only 6-8 mA when active and only 1-5 uA when the transmitter unit is on standby. According to some embodiments the transmitter unit has an operational life of up to two years, but may then subsequently be replaced by a replacement transmitter unit 50. According to such embodiments, the transmitter unit 50 is configured such that the battery of the transmitter unit 50 may be replaced by a user to extend the operational life of the transmitter unit to be similar to the long operational life of the encapsulated light board 12. According to still other inventive embodiments, the transmitter unit has an operational life of up to ten years depending on the batteries that are provided therein.

The components of the inventive lighting device 10 have a long operational life so that the batteries do not need to be removed or replaced. According to some inventive embodiments, the batteries 41 of the light board 12 are CR2450 batteries, which have a capacity of 620 mAH. Given that two of such batteries 41 are provided in the light board 12, the light board 12 is accordingly provided with a capacity of 1240 mAH. The self-discharge rate of each battery is 1% per year, so in order to keep 10 years battery life the remaining battery capacity is 90% remaining, based on 620×2× 90%=1160 mAH (10 years discharge=1%×10 years=10%). The inventive lighting device 10 may sit in storage from factory to install in car for about 1 year (1 uA/h×24×365 days=8.76 mAH). Accordingly, to calculate the battery life, one must deduct the self-discharge and the storage. Accordingly, the capacity required to operate the inventive light board 12 for ten years is 1240×90%−8.76=1106 mAH, which is well below the total battery capacity provided by the two batteries 41 of the wireless light board 12. Accordingly, the inventive light board 12 has at least a ten year operational life without needing to have the batteries removed or replaced.

Similarly, the capacity required to operate the inventive transmitter unit 50 with its one CR2450 battery, which has a capacity of 620 mAH, is calculated the under the same assumptions. 620×90%−8.76=550 mAH, which is well below the total battery capacity provided by the battery of the wireless transmitter unit 50. Accordingly, the inventive transmitter unit 50 has at least a ten year operational life without needing to have the battery removed or replaced.

Accordingly, the present invention provides a wireless lighting device 10 that is a stand alone design, having no interaction with the electrical system of a vehicle on which the device 10 is installed, thereby avoiding the problems of existing devices including short circuit and increased load on the electrical system of the vehicle. Furthermore, the wireless lighting device 10 is easy to install on a vehicle, whether that installation be at the time of the vehicle's manufacture or in an aftermarket context, thereby resulting in a lower installation cost. The wireless light device 10 additionally provides a unique and customizable feature for brands or for consumers. The device 10 enhances ambient lighting of a vehicle and also provides enhanced safety features. The coin batteries used in the inventive device 10 additionally provide a benefit that the batteries are easily available and do not pose a fire risk or liquid leakage problem. Furthermore, the particular design of the inventive device 10, with the selection of the particular batteries and the encapsulation of the light board 12 and the transmitter unit 50 ensures that the batteries maintain enough capacity to provide an operational life of at least ten years for the inventive wireless device 10 without the need for battery removal or replacement. The wireless nature of the inventive lighting device 10 ensures that there is no wiring needed for the device 10, meaning there is no need to dismantle the vehicle in order to install the device 10. This is a particularly appealing selling point for aftermarket users. Additionally, the inventive wireless lighting device 10 is compact and light weight, meaning that the light board 12 and the transmitting unit 50 maybe easily installed at various positions inside or outside of a vehicle. Furthermore, the inventive wireless lighting device 10 provide customization so that various words and/or design may be displayed on the light board 12 based on a customer's particular preferences.

Furthermore, the encapsulation of the light board 12 and the transmitter unit 50 of the inventive lighting device 10 provides the benefits of preventing the effects of environmental factors such as water, humidity, moisture, and extreme temperatures while also preventing human interference. By preventing a user from accessing the internal components of the various devices, the inventive device 10 is protected from human errors such as failing to replace the batteries correctly or at all.

In conclusion, the present invention proposes a novel wireless light board, which is slim, waterproof, power-saving, easy to install, convenient for battery replacement and can solve the problem of misalignment.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The embodiments have been described above to demonstrate the technical contents and characteristics of the present invention and enable the persons skilled in the art to understand, make, and use the present invention. However, these embodiments are not intended to limit the scope of the present invention. Contrarily, any equivalent modification or variation according to the spirit of the present invention would be also included within the scope of the claims of the present invention. The claims of the present invention should be interpreted in the broadest sense to cover all the equivalent modifications and variations.

The foregoing description is illustrative of particular embodiments of the invention but is not meant to be a limitation upon the practice thereof. The following claims, including all equivalents thereof, are intended to define the scope of the invention.

The invention claimed is:

1. A wireless lighting device for vehicle accessories, the wireless lighting device comprising:
   an encapsulated light board comprising:
   a housing comprising a baseplate integrally formed as a unitary body and a top cover having at least one light permeable region, the baseplate having only one opening therein, the top cover configured to be irreversibly sealed to the baseplate around the one opening of the baseplate to define an encapsulant and an internal volume therein that is inaccessible by a user;
   a backlight module configured to be accommodated within the internal volume of said housing, said backlight module comprising a circuit board, a plurality of light emitting elements, a sensor configured to detect a signal, and a control module configured to turn the light emitting elements on and off according to the signal detected;
   a power module including at least one battery and a conductive strip, the conductive strip extending from an end of the circuit board and configured to electrically connect the at least one battery to the circuit board and provide power to the sensor and said backlight module for 10 years of vehicle usage without opening said encapsulated light board.

2. The wireless lighting device of claim 1 wherein the sensor is one of a magnetic sensor or a gravity sensor.

3. The wireless lighting device of claim 1 further comprising a transmitter configured to transmit a signal perceptible by the sensor.

4. The wireless lighting device of claim 3 wherein the transmitter is configured to be installed on a frame of a vehicle or on a door of a vehicle.

5. The wireless lighting device of claim 3 wherein the signal transmitted by the transmitter is a radio frequency signal.

6. The wireless lighting device of claim 3 wherein the transmitter is provided within a transmitter unit having a housing.

7. The wireless lighting device of claim 6 wherein the transmitter unit additionally comprises a battery contained within the housing of the transmitter unit.

8. The wireless lighting device of claim 6 wherein the housing of the transmitter unit fully encapsulates the transmitter unit.

9. The wireless lighting device of claim 1 wherein the baseplate of said housing of said encapsulated light board defines at least one recess.

10. The wireless lighting device of claim 9 wherein the baseplate of said housing of said encapsulated light board includes a plurality of ridges formed within the at least one recess.

11. The wireless lighting device of claim 9 wherein the at least one recess in the baseplate of said housing of said encapsulated light board includes a main recess configured to accommodate the circuit board and two battery recesses configured to accommodate the power module.

12. The wireless lighting device of claim 1 wherein the baseplate and the top cover of said housing of said encapsulated light board are formed as a tube.

13. The wireless lighting device of claim 12 wherein said housing of said encapsulated light board further comprises a cap that is configured to be irreversible sealed to the baseplate and the top cover.

14. The wireless lighting device of claim 1 wherein the plurality of light emitting elements are LEDs.

15. The wireless lighting device of claim 1 wherein the circuit board includes an anti-electromagnetic interference structure which is formed by net copper layout.

16. The wireless lighting device of claim 1 wherein the sensor is a radio frequency transceiver.

17. The wireless lighting device of claim 1 wherein the light board further comprises a second power module including a second battery and a second conductive strip.

18. The wireless lighting device of claim 1 wherein the at least one battery is a CR2450 battery.

19. The wireless lighting device of claim 1 wherein the at least one battery has a capacity of 620 mAH.

20. The wireless lighting device of claim 1 wherein the at least one battery includes two batteries having a total capacity of 1240 mAH.

21. The wireless lighting device of claim 1 wherein the light permeable region of the top cover includes a customizable inscription.

22. The wireless lighting device of claim 1 wherein the encapsulated light board is configured to be installed in a vehicle seat.

23. The wireless lighting device of claim 1 wherein the encapsulated light board is configured to be installed in a vehicle floor mat.

24. The wireless lighting device of claim 1 wherein the encapsulated light board is configured to be installed in a vehicle door, a vehicle liftgate, a vehicle tailgate, or vehicle door sill.

25. The wireless lighting device of claim 1 wherein the encapsulated light board has a standby power of 1 uA.

* * * * *